United States Patent [19]

Guerrini et al.

[11] Patent Number: 4,702,107
[45] Date of Patent: Oct. 27, 1987

[54] DEVICE FOR DETECTING THE LEVEL OF A LIQUID CONTAINED IN A TANK

[75] Inventors: Giampaolo Guerrini; Franco Sommacal, both of Ivrea, Italy

[73] Assignee: Ing. C. Olivetti & C., S.p.A., Ivrea, Italy

[21] Appl. No.: 870,444

[22] Filed: Jun. 4, 1986

[51] Int. Cl.[4] .................................. G01F 23/68
[52] U.S. Cl. .............................. 73/319; 338/33
[58] Field of Search ............. 73/319, 320, 308, 313; 338/33

[56] References Cited

U.S. PATENT DOCUMENTS 3,113,282 12/1963 Coleman ........................... 338/33
3,433,073 3/1969 Kunert ........................... 338/33 X
4,052,901 10/1977 Bjork ............................. 338/33 X
4,342,224 8/1982 Hara et al. ....................... 73/313 X

FOREIGN PATENT DOCUMENTS 0038894 12/1980 European Pat. Off. .
0055312 12/1980 European Pat. Off. .
2614536 10/1977 Fed. Rep. of Germany ........ 73/319
2509044 6/1982 France .
2130733A 10/1982 United Kingdom .

Primary Examiner—Daniel M. Yasich
Attorney, Agent, or Firm—Banner, Birch, McKie & Beckett

[57] ABSTRACT

A device for detecting the level of a liquid contained in a tank, for example the level of the fuel contained in the tank of a motor car. The device comprises a vertical bar inserted in the tank and a float movable with respect to the bar to follow the variations in the level. The bar, which is of insulating material, acts as a supporting element for a printed circuit having at least one continuous conductive track and a variable resistor parallel to the continuous track. On the float there is mounted a metal element which simultaneously contacts both the conductive track and the variable resistor.

9 Claims, 5 Drawing Figures

DEVICE FOR DETECTING THE LEVEL OF A LIQUID CONTAINED IN A TANK

BACKGROUND OF THE INVENTION

The present invention relates to a device for detecting the level of a liquid contained in a tank, in particular for detecting the level of the fuel contained in the tank of a motor car and generating a corresponding electric signal.

The device comprises a substantially cylindrical container adapted to be inserted in the tank, a vertical bar disposed longitudinally inside the cylindrical container and a float movable with respect to the bar to follow the variations in the level of the liquid.

A device of this type is known from U.K. Patent Application No. 2,130,733. in which a wire acting as a variable resistor is wound on the bar and in which a sliding contact held resiliently against the wire of the bar is mounted on the float. A pair of spiral springs of metal and very flexible are disposed one above and the other below the float, coaxially with the bar, in such manner as not to touch the wire which is wound around the bar itself. The upper spring permanently connects the sliding contact mounted on the float to a terminal outside the container. The electrical resistance between this external terminal and the upper end of the wire wound on the bar is inversely proportional to the level of the fuel and is utilized to generate the desired electric signal.

The presence of the metal springs coaxial with the bar and close to the wire which acts as a variable resistor makes this device not very reliable, however, above all if used in unstable conditions of the tank; in fact, rocking and/or tilting of the latter may cause undesired contacts between the metal springs and the wire wound on the bar and, consequently, generate an electric signal not corresponding to the actual level of the liquid in the tank.

SUMMARY OF THE INVENTION

The technical problem that the present invention proposes to solve is that of producing a device for detecting the level of the liquid in a tank which, by obviating the disadvantages of the known device, is very reliable and at the same time also very inexpensive.

This technical problem is solved by the device according to the invention, wherein the vertical bar bears a printed circuit having at least one continuous conductive track and a variable resistor parallel to the conductive track, a strip of conductive paste and a plurality of conductive elements connected to the strip transverse with the axis of the vertical bar, and on the float there is mounted an element which simultaneously contacts both the continuous conductive track and one of the conductive elements to follow the variation of the liquid.

BRIEF DESCRIPTION OF THE DRAWINGS

This characteristic and other characteristics of the invention will become clear from the following description of a preferred embodiment, given by way of example and non-limitatively with the aid of the accompanying drawings, in which.

DESCRIPTION OF THE PREFERRED EMBODIMENTS

Figure 1:
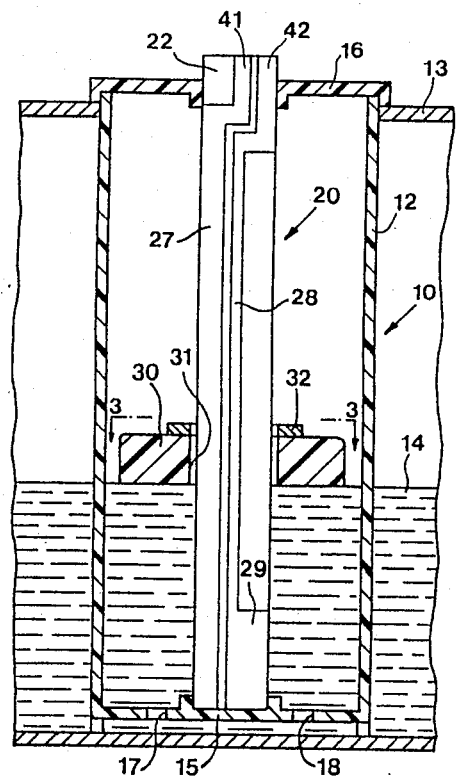
FIG. 1 is a side view in section of a device according to the invention.

Referring to FIG. 1, a device 10 according to the invention comprises a cylindrical container 12 which is adapted to be inserted inside a tank 13 for detecting the level of the liquid 14 contained therein. The liquid 14, for example, may be the fuel for a motor car or some other means of transport.

The container 12 comprises a side wall, a bottom wall 15 and a top cover 16. In the bottom wall 15 there are formed two apertures 17 and 18 through which the liquid 14 can enter the container 12.

Figure 2:
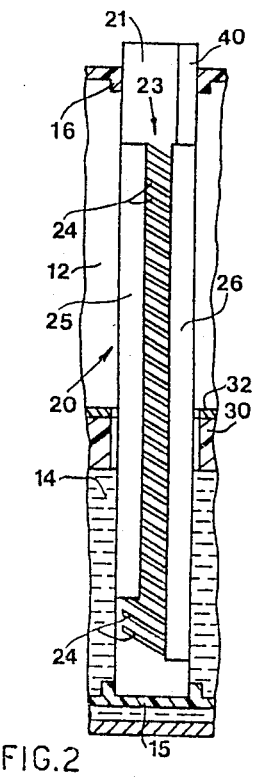
FIG. 2 is another side view of a detail of the device according to the invention.
Figure 3:
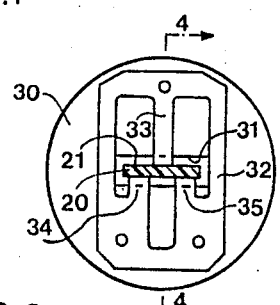
FIG. 3 is a section on the line 3—3 in FIG. 1.

Inside the container 12 is arranged a vertical bar 20 of insulating material, for example glass-reinforced resin, having a rectangular cross-section (FIG. 3) so as to define two surfaces 21 and 22 (FIGS. 1 and 2) parallel to one another.

In accordance with a characteristic of the invention, on the surface 21 (FIG. 2) there is deposited by means of screen process printing, by the same method as is used for producing printed circuits, a variable resistor 23 constituted by two lateral strips 25 and 26 of resistive hardened paste, these strips being interconnected by a plurality of elements 24 of conductive material which are disposed, parallel to one another, substantially transversely of the longitudinal axis of the bar 20.

Figure 4:
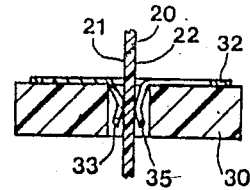
FIG. 4 is a section on the line 4—4 in FIG. 3.

On the surface 22 (FIGS. 1 and 4) of the bar 20, on the other hand, there is deposited a continuous and conductive lateral track 27 and a conductive central track 28 which has a bottom lateral zone 29 having a predetermined height from the bottom wall 15 of the container 12 and, therefore, from the bottom of the tank 13. Strip 25 is shorter than the strip 26 and the conductive elements 24 adjacent to the zone 29 are connected only to the strip 26 to increase the variation of resistivity in the bottom zone of the bar 20, whereby improving the sensitivity of the device for low levels of the liquid 14.

A float 30 of plastics material is mounted inside the cylindrical container 12 and is provided with a rectangular slot 31 inside which the bar 20 is inserted. The slot 31 has dimensions such as to permit free sliding of the float 30 with respect to the bar 20 to follow the variations in the level of the liquid 14.

On the top of the float 30 there is fixed a metal element 32 which is shaped in such manner as to have a flexible tongue 33 (FIG. 4) adapted to contact the elements 24 of the variable resistor 23 and two flexible tongues 34 and 35 adapted to contact the conductive track 27 and the bottom lateral zone 29, respectively, of the track 28. The upper ends 40, 41 and 42 of the variable resistor 23 and the conductive tracks 27 and 28, respectively, emerge from the top cover 16 of the cylindrical container 12 and are adapted to be connected to an electric circuit of known type to generate an electric signal corresponding to the level of the liquid 14 contained in the tank 13.

The device 10 hereinbefore described operates in the following manner.

In any working position, irrespective of the level of the liquid 14 and therefore of the height at which the float 30 is located with respect to the bottom 15 of the cylindrical container 12, the flexible tongue 34 of the metal element 32 is always in contact with the conductive track 27.

When the float 30 is located above the bottom zone 29, the tongue 33 of the element 32 is in contact with one of the elements 24 of the variable resistor 23. In this way, at the ends of the terminals 40 and 41 there is a resistance inversely proportional to the level of the liquid 14. This resistance enables the electric circuit to which the device 10 is connected to generate in known manner an electric signal corresponding to the level of the liquid 14.

On the other hand, when the level of the liquid 14 falls below a predetermined value, corresponding to the height of the bottom zone 29 of the track 28, the tongue 35 of the element 32 comes into contact with this zone 29, thus making the electrical connection between the terminals 41 and 42. In this case, an electric signal corresponding to the predetermined level reached is generated in any known manner.

The operation of the device 10 hereinbefore described is not affected negatively by possible rocking and/or tilting of the tank 13, the tongues 33, 34 and 35 of the element 32 being always in contact with the respective zones of the bar 20 and there not being other elements which are able to interfere with detection of the level of the liquid 14.

It is obvious that modifications and additions of parts may be made in the device hereinbefore described without thereby departing from the scope of the present invention.

Figure 5:
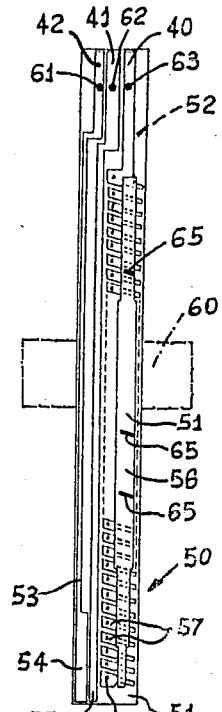
FIG. 5 is a side view of a detail of the device of FIG. 1 according to another embodiment of the invention.

The embodiment of FIG. 5 relates to a bar 50 of insulating material similar to the bar 20 and having first and second surfaces 51 and 52 parallel to one another.

The surfaces 51 and 52 bear specularaly to one another a pair of circuits, each comprising a continuous conductive longitudinal track 55 similar to track 27, a conductive track 53 having a bottom lateral zone 54 similar to the track 28 and zone 29, a variable resistor 56 constituted by a strip of resistive paste similar to the strip 26 and a plurality of transverse conductive elements 57 similar to the conductive elements 24.

The conductive tracks 53 and 55 of the two surfaces 51 and 52 are connected in parallel by bridging conductors 61 and 62 with their terminals 42 and 41, respectively and the ends of the variable resistors 56 are connected in parallel by a bridging conductor 63 to the terminal 40.

Each of the conductive element 57 comprises a free end projecting toward the tracks 53 and another end embedded and in electrical contact with a corresponding section of the resistive paste of the resistor 56. The free end of each conductive element 57 on the first surface 51 is electrically connected by means of a bridging conductor 58 with the free end of the specular conductive element 57 on the second surface 52.

The bar 50 is cooperative with a float 60 similar to float 30 and supporting a metal element not shown in the drawing but similar to the metal element 32, and comprising three pairs of flexible tongues to contact simultaneously the circuits of the surfaces 51 and 52. Namely, a first pair of tongues is provided to contact the bottom zone 54, a second pair of tongues contacts the continuous track 52 and the third pair of tongues contacts selectively one or more conductive elements 58 on the surfaces 51 and 52.

In view of the described parallel connection of the circuits on the surfaces 51 and 52, the signal on the indicating circuit is not altered also if one of the tongues is temporarily withdrawn from the conductive element, conductive track or zone, as consequence of vibrations of the tank.

The strip of paste 56 provides a plurality of sections whose size is configurated to change in dependence on the size of a corresponding section of the tank. It enables the circuit to have a signal strictly proportional to the level of the liquid in the tank.

One or both strips 56 provide a series of transversal cuts 65 whose length is dimensioned to reduce at a minimum the error of the signal for a given level of the liquid. The cuts 65 may be obtained by laser trimming in final tests during the manufacturing process in a manner known per se.

It is clear that, since no sliding contact exists between the resistor 26 or 56 and the metal element of the float 30 or 60, the operation of the device 10 either using a bar 20 or a bar 50 is not affected negatively by wear processes in the contacting elements.

What we claim is:

1. In a device for detecting the level of a liquid contained in a tank, comprising a vertical bar inserted in the tank and a float movable up and down the bar to follow the variations in the level of the liquid, the combination comprising:

a printed circuit borne by said vertical bar and including at least one vertical strip of resistive hardened paste along a longitudinal axis of the bar and a plurality of conductive elements supported by said bar, wherein the vertical strip of resistive paste include one terminal and different sections defining different resistive amounts with respect to said one terminal, and wherein said conductive elements are disposed parallel to one another and transverse with respect to said bar and have ends electrically connected to different sections of said strip of resistive paste;

a metal element mounted on the float and sliding on the printed circuit to contact selectively one element of the plurality of conductive elements to be connected to a different section of the strip of resistive paste in response to any up and down movement of the float, due to a variation of level of the liquid; and connecting means for electrically connecting said metal element with another terminal of the printed circuit to provide a different resistive amount between the one and the other terminal corresponding to a different level of the liquid in the tank.

2. A device according to claim 1, wherein said vertical strip of resistive paste has a transversal dimension which is variable along the strip in order to cause said resistive amount to be substantially inversely proportional to the level of liquid in spite of sections of different sizes of the tank.

3. A device according to claim 1, wherein said strip of resistive paste comprises trimmings on different sections thereof configurated for reduction of errors of the values of said resistive amounts for given values of the level of the liquid.

4. A device according to claim 1, wherein said connecting means comprise a continuous conductive track supported by said printed circuit and wherein said metal element comprises a first and a second flexible tongue to contact simultaneously said conductive track and said one element.

5. A device according to claim 4, wherein said vertical bar comprises a first plane surface, wherein said conductive elements are disposed substantially transversely of the longitudinal axis of said bar and wherein said at least one vertical strip of resistive paste is deposited on said first surface adjacent to said plurality of conductive elements.

6. A device according to claim 4, wherein the printed circuit moreover comprises a second conductive track having a bottom zone disposed at a predetermined height from the bottom of the tank to be contacted by the metal element when the level of the liquid falls below a predetermined value.

7. A device according to claim 1, further comprising another strip of resistive paste connected in parallel with at least a portion of said plurality of conductive elements.

8. A device according to claim 7, further comprising a group of said plurality of conductive elements which is disposed adjacent to the bottom zone of the bar and wherein the conductive elements of said group are connected only to one of the two strips.

9. In a device for detecting the level of a liquid contained in a tank, comprising a vertical bar inserted in the tank and a float having a central slot to accomodate with clearance the bar and movable up and down the bar to follow the variations in the level of the liquid, wherein the vertical bar is shaped in such a manner as to define first and second plane surfaces parallel to one another, the combination comprising:

a pair of printed circuits, having at least a pair of continuous conductive tracks along a longitudinal axis of the bar and a plurality of first and second conductive elements disposed transversely to said longitudinal axis of the bar, wherein each printed circuit is born on the first and second surface of the bar, respectively;

a metal element mounted on the float and having two pairs of first and second flexible tongues to contact simultaneously both the conductive tracks and said conductive elements on the first and second surfaces respectively; and a pair of vertical strips of resistive paste supported by the first and the second surface of said bar parallel to the longitudinal axis of the bar and having different sections connected with one end of said plurality of conductive elements; and first means for electrically connecting in parallel the pair of conductive tracks of the first and second surfaces, second means for electrically connecting in parallel one terminal of the two pairs of strips and third means for electrically connecting each one first conductive element with a corresponding other second conductive element of the first and second surfaces; and wherein each one of said first and second conductive elements is contactable by the pairs of second flexible tongues simultaneously with the contact of the first pair of flexible tongues with said two continuous conductive tracks to electrically and reliably connect a different section of resistive paste with said conductive tracks in dependence on the level of the liquid.

* * * * *